(12) United States Patent
Paul

(10) Patent No.: US 11,813,577 B2
(45) Date of Patent: Nov. 14, 2023

(54) SYSTEM AND METHOD FOR PRODUCING HOLLOW FIBRE MEMBRANES

(71) Applicant: FRESENIUS MEDICAL CARE DEUTSCHLAND GMBH, Bad Homburg (DE)

(72) Inventor: Michael Paul, Lebach (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 159 days.

(21) Appl. No.: 17/437,427

(22) PCT Filed: Mar. 17, 2020

(86) PCT No.: PCT/EP2020/057231
§ 371 (c)(1),
(2) Date: Sep. 9, 2021

(87) PCT Pub. No.: WO2020/187888
PCT Pub. Date: Sep. 24, 2020

(65) Prior Publication Data
US 2022/0088543 A1     Mar. 24, 2022

(30) Foreign Application Priority Data
Mar. 20, 2019    (DE) ............... 10 2019 203 837.9

(51) Int. Cl.
*B01D 69/08*     (2006.01)
*B01D 63/02*     (2006.01)

(52) U.S. Cl.
CPC ......... *B01D 69/088* (2013.01); *B01D 63/021* (2013.01); *B01D 2323/08* (2013.01); *B01D 2323/10* (2013.01); *B01D 2323/42* (2013.01)

(58) Field of Classification Search
None
See application file for complete search history.

(56) References Cited

U.S. PATENT DOCUMENTS

| 1,871,100 A | 8/1932 | Walton et al. |
| 2,509,279 A | 5/1950 | Sisson |
| (Continued) | | |

FOREIGN PATENT DOCUMENTS

| DE | 756808 C | 6/1953 |
| GB | 325617 A | 2/1930 |
| (Continued) | | |

OTHER PUBLICATIONS

International Preliminary Report on Patentability issued in corresponding International Patent Application No. PCT/EP2020/057231 (English translation) dated Sep. 30, 2021 (8 pages).

(Continued)

*Primary Examiner* — Krishnan S Menon
(74) *Attorney, Agent, or Firm* — Kilyk & Bowersox, P.L.L.C.

(57) ABSTRACT

The invention relates to an apparatus and a method for the manufacture of at least one hollow fiber membrane, wherein a spinning mass is extruded via a spinning unit to form a spinning thread and precipitated in a precipitation bath to form a hollow fiber membrane and the hollow fiber membrane is optionally rinsed in a rinsing bath, wherein furthermore the hollow fiber membrane is passed through at least one drying unit, wherein the drying unit comprises a pressure section which is constructed in such a way that a positive pressure compared with atmospheric pressure can be set in the pressure section, and at least part of the precipitating agent or rinsing agent contained in the at least one hollow fiber membrane (104) is separated from the at least one hollow fiber membrane.

7 Claims, 7 Drawing Sheets

(56) References Cited

U.S. PATENT DOCUMENTS

Figure 1:
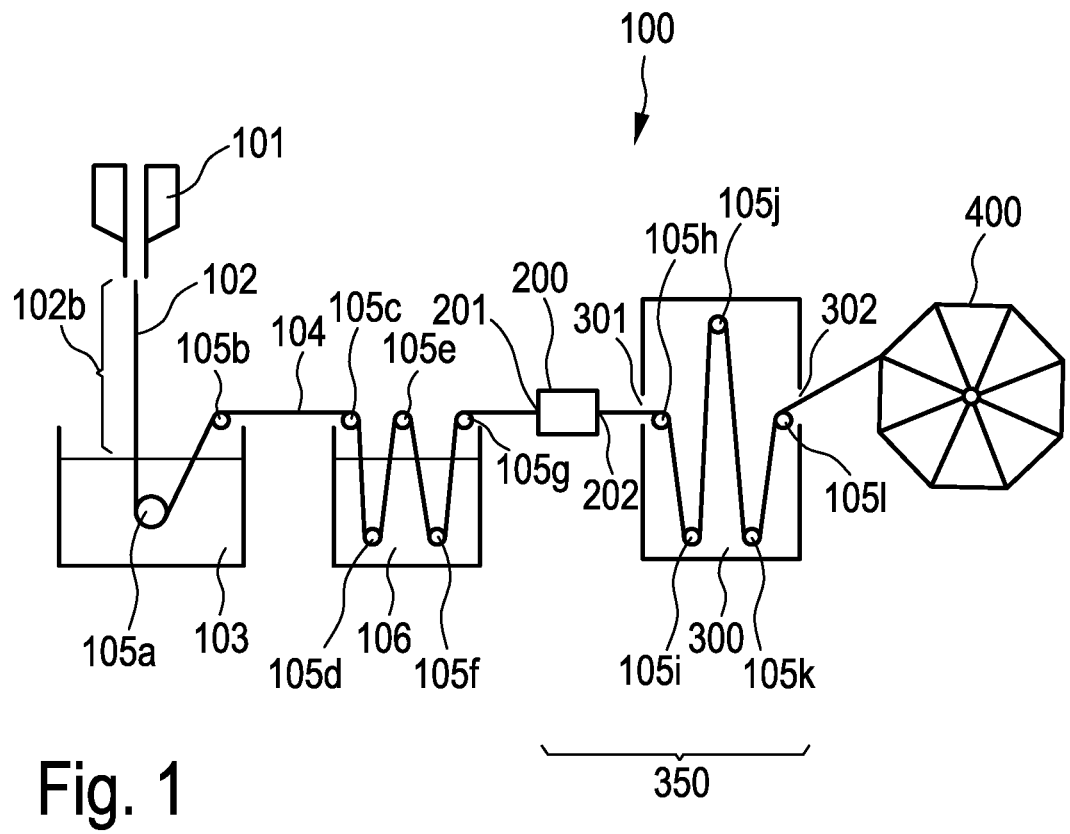

| | | | |
|---|---|---|---|
| 3,983,722 | A | 10/1976 | Lefebvre et al. |
| 2005/0087637 | A1 | 4/2005 | Keller et al. |
| 2012/0022242 | A1 | 1/2012 | Domard et al. |
| 2013/0104416 | A1 | 5/2013 | Kurashina et al. |
| 2017/0368507 | A1 | 12/2017 | Bauer et al. |
| 2019/0091626 | A1 | 3/2019 | Voigt et al. |
| 2020/0030751 | A1 | 1/2020 | Keller et al. |

FOREIGN PATENT DOCUMENTS

| | | | |
|---|---|---|---|
| GB | 731415 | A | 6/1955 |
| GB | 2089285 | A | 6/1982 |
| JP | 6078604 | A | 5/1985 |
| JP | 200668689 | A | 3/2006 |

OTHER PUBLICATIONS

International Search Report and Written Opinion issued in corresponding International Patent Application No. PCT/EP2020/057231 (with English translation of International Search Report) dated Jul. 10, 2020 (12 pages).

Search Report issued in corresponding German Patent Application No. 10 2019 203 837.9 dated Nov. 19, 2019 (9 pages).

SYSTEM AND METHOD FOR PRODUCING HOLLOW FIBRE MEMBRANES

This application is a National Stage Application of PCT/EP2020/057231, filed Mar. 17, 2020, which claims priority to German Patent Application No. 10 2019 203 837.9, filed Mar. 20, 2019.

TOPIC

The invention relates to an apparatus for the manufacture of hollow fiber membranes. In particular, the invention relates to an apparatus for the manufacture of hollow fiber membranes, wherein the apparatus comprises an improved drying unit.

In further aspects, the invention relates to methods for the manufacture of hollow fiber membranes. In particular, the invention relates to methods for the manufacture of hollow fiber membranes with an improved drying process of the hollow fiber membranes.

BACKGROUND OF THE INVENTION

Hollow fiber membranes are widely used in filtration technology. Hollow fiber membranes are used in particular in medical technology, e. g. in dialysis, in order to remove harmful metabolites from the blood of patients with kidney disease. Hollow fiber membranes are also used in water treatment in order to treat contaminated water. For such applications, the hollow fiber membranes are built into hollow fiber membrane filters, as they are referred to. In these hollow fiber membrane filters, a large number of hollow fiber membranes are arranged within a cylindrical housing of the hollow fiber membrane filter to form a hollow fiber membrane bundle. A hollow fiber membrane filter for dialysis contains 10,000 hollow fiber membranes with a length of approx. 23 cm in a typical version of such a filter. In the field of medical technology, in particular in the field of dialysis, such hollow fiber membrane filters are provided for their use as single use articles, for reasons of hygiene. There is therefore an enormous demand for hollow fiber membrane filters in dialysis alone, in order to be able to provide patients with kidney disease with the vital dialysis therapy.

In order to meet the great demand for hollow fiber membranes for the manufacture of hollow fiber membrane filters, enormous demands are placed on the productivity of the manufacturing processes of hollow fiber membranes. Methods have established themselves in the dry-wet spinning process, as it is referred to, in which initially a fluid spinning mass is provided, which is extruded into a spinning thread and which is coagulated to a hollow fiber membrane in a phase inversion process and precipitated. Such spinning processes are designed in such a way that a large number of simultaneously produced hollow fiber membranes are combined to form a group of hollow fiber membranes and are taken up on a reel to form bundle strands. The bundle strands are then divided into required lengths into individual hollow fiber membrane bundles, which are then used in hollow fiber membrane filters.

Methods known from the prior art for the manufacture of hollow fiber membranes using the dry-wet process are based on a prepared spinning mass. A typical spinning mass is generally produced in the form of a polymer solution of a hydrophobic polymer, a hydrophilic polymer, further additives, if applicable, and a polar aprotic solvent.

The spinning mass is extruded in a spinning unit through spinnerets. The spinning unit may be equipped with a large number of spinnerets so that a group of hollow spinning threads can be extruded through the spinnerets. A single spinneret is constructed in such a way that the cavity of the spinning threads is filled with a coagulation medium which causes the phase inversion of the spinning mass in the spinning thread. In the present application, the terms "cavity" and "lumen" are used as synonyms. Spinnerets of this type are known in the state of the art. As an example, a spinneret shown in FIG. 1 to FIG. 5 of WO 03/076701 A1 is mentioned here. The individual spinning threads are guided vertically through a precipitation gap and are fed into a precipitation bath, for example in water, where the membrane structure of the hollow fiber membrane is further consolidated. The individual hollow fiber membranes are then fed out of the precipitation bath by pulleys and are guided, usually into one or more rinsing baths, via further pulleys and guide means in order to remove solvent and excess polymer from the membrane. The rinsing baths often contain water as the rinsing medium.

After having been passed through the precipitation bath and the rinsing bath, the hollow fiber membranes are completely filled with liquid, in particular water, i. e. the cavity of the hollow fiber membranes and the pores of the walls of the hollow fiber membranes are filled with liquid, in particular water. The hollow fiber membrane thus transports, for example, several times its own weight of liquid after having been guided out of the precipitation bath or the rinsing bath.

After leaving the rinsing bath, the hollow fiber membranes are dried in accordance with known methods of manufacture by introducing the individually guided hollow fiber membranes into a drying chamber via pulleys and suitable guiding means. In the drying chamber, the distance to be covered by the hollow fiber membranes is determined by pulleys and guide means. Depending on the transport speed, this results in a predetermined residence time of the hollow fiber membranes in the drying chamber. Drying is effected by applying an increased temperature. Here, the temperature is set at a level so that the liquid, in particular water, transported in the hollow fiber membrane evaporates. The evaporated liquid is discharged from the drying chamber so that the hollow fiber membrane is discharged from the drying chamber in a dry state after passing through the drying chamber and is able to be fed to further processing steps.

Within the manufacturing process, after drying of the hollow fiber membranes, a step of undulation of the hollow fiber membranes can be carried out. Here, the hollow fiber membranes are mechanically embossed with a wave form by means of suitable gear wheels. Further, it is known that a group of hollow fiber membranes is brought together and taken up by a reel. The hollow fiber membrane bundles required for the manufacture of the hollow fiber membrane filters are obtained by cutting out individual bundle strands from the hollow fiber membranes which have been wound onto the reel.

The extrusion rate of the spinning mass, the pulleys and the guide means as well as the reel for receiving the hollow fiber membranes determine the speed at which the hollow fiber membranes can be transported through the apparatus for manufacturing the hollow fiber membranes. Transport speeds of approx. 450 mm/s are known from the state of the art for the manufacture of hollow fiber membranes. The transport speed of the hollow fiber membranes is ultimately decisive for the productivity of the manufacturing process. However, the transport speed cannot be increased at will, since an increasing mechanical impact on the hollow fiber membranes during transport is likely to result in an increased number of damaged fibers. In particular, it is to be expected that individual fibers will break or collapse if the transport speed is chosen too high. Such damage of the hollow fiber membranes make the hollow fiber membranes which have been brought together and taken up by the reel unusable in the form of their separated hollow fiber membrane bundles for further processing into hollow fiber membrane filters.

The drying process of known methods of manufacture can also have a damaging effect on the hollow fiber membranes. In order to achieve the desired high productivity, the methods in accordance with the state of the art require high temperatures to be used in order to dry the fibers completely in the drying chamber at a specified transport rate. If the temperatures are too high, deformations can be observed on the hollow fiber membranes, which render them unsuitable for use in the construction of hollow fiber membrane filters. In addition, if the exposure to high temperatures is too long, thermo-oxidative damage to the hollow fibers can occur. In addition, the high drying temperatures in the drying chamber require a large amount of energy, which in turn makes the manufacturing process more expensive.

GB 731,415 discloses a device for drying textile fibers, in particular artificial silk. GB 731,415 describes a drying channel through which a plurality of textile fibers, which for example are arranged in parallel, are passed. The drying channel comprises heating elements. It is also described that air is supplied to the drying channel in order to dry the textile fibers.

U.S. Pat. No. 2,509,279 describes devices for the treatment of fibers with fluids or gases. The fibers are passed through tubes in which they can be supplied with the gases.

DE 509 429 shows a device for drying spun artificial silk threads. The artificial silk threads are washed with cold water and are passed through a tube for drying, which tube is fed with hot air. The threads are then guided over a heated plate and wound onto a reel.

OBJECT OF THE INVENTION

From today's point of view, the methods for manufacturing hollow fiber membrane filters which are known from the state of the art are no longer satisfactory in terms of their productivity and efficiency. In particular from the point of view of the manufacture of hollow fiber membrane filters, there is a permanent need to increase the speed of the manufacture of hollow fiber membranes. In addition, there is also a need to optimize the manufacturing process in the production of hollow fiber membranes in an energy-efficient and cost-effective manner.

SUMMARY OF THE INVENTION

In a first aspect, this object is solved by a device with the features of claim 1. The dependent claims 2 to 10 represent alternative embodiments.

In a second aspect, the object is solved by a method with the features according to claim 11. The dependent claims 12 to 15 represent further preferred embodiments.

In a third aspect, the object is solved by a method for the manufacture of a hollow fiber membrane, which is characterized in that the spinning speed of the hollow thread is set to over 550 mm/s, preferably over 650 mm/s and more preferably over 750 mm/s.

DETAILED DESCRIPTION OF THE INVENTION

In a first aspect the invention relates to an apparatus for the manufacture of at least one hollow fiber membrane, comprising
a spinning unit comprising at least one annular gap nozzle which is fluidically connected to a source of a spinning mass and a source of a coagulation medium in order to extrude at least one hollow spinning thread from the spinning mass, the cavity of which hollow spinning thread is filled with the coagulation medium,
a precipitation bath for precipitating the at least one spinning thread to form at least one hollow fiber membrane,
if necessary, at least one rinsing unit for rinsing the at least one hollow fiber membrane, at least one drying unit for drying the at least one hollow fiber membrane,
if necessary, a receiving unit for receiving the at least one hollow fiber membrane on a support,
characterized in that
the at least one drying unit comprises a pressure section which is constructed in such a way that a positive pressure compared with atmospheric pressure can be set in the pressure section.

The apparatus is constructed in such a way that the at least one spinning thread is fed into the precipitation bath and is precipitated to at least one hollow fiber membrane, wherein further
the at least one hollow fiber membrane which is obtained from the precipitation bath is optionally introduced into a rinsing bath and rinsed, wherein further
the at least one hollow fiber membrane which is obtained from the precipitation bath, or the at least one hollow fiber membrane which is obtained from the rinsing bath, is fed into the drying unit and dried, wherein further
the apparatus can be constructed in such a way that the at least one hollow fiber membrane dried in the drying unit is guided to a receiving unit and is received on a support.

For the sake of simplification, in the further explanations, the terms "at least one annular gap nozzle" or "an annular gap nozzle", "at least one spinning thread" or "a spinning thread", "at least one hollow fiber membrane" or "a hollow fiber membrane" are to be understood also always to include the plural, i. e. "annular gap nozzles", "spinning threads" and "hollow fiber membranes", unless otherwise stated. Modern hollow fiber spinning apparatuses can comprise more than 1000 or 2000 annular gap nozzles.

The walls of the at least one hollow fiber membrane, which can be produced using the above mentioned apparatus, are preferably porous. The pores as well as the cavity, i. e. the lumen, of the hollow fiber membrane are filled with liquid, in particular water, when the hollow fiber membrane is passed through the precipitation bath and the rinsing bath if present. The inventors have found that, when the hollow fiber membrane which has been produced passes through the pressure section of the drying unit, at least part of the liquid, in particular the water, can be separated from the pores of the hollow fiber membrane and the cavity, i. e. the lumen, of the hollow fiber membrane by means of the set positive pressure compared with atmospheric pressure. The weight of the hollow fiber membrane laden with liquid is significantly reduced thereby. Surprisingly, it was possible to increase the transport speed of the hollow fiber membrane in the apparatus without fiber breaks or other damage such as flattening occurring as a result of this. In particular, it was also possible to carry out the thermal drying at lower temperatures or in shorter section lengths of the hollow fiber membranes with the same degree of drying, so that overall a significant saving of energy could be achieved in the manufacturing process of the hollow fiber membranes and thermo-oxidative damage of the hollow fibers was reduced. In addition, the hollow fibers which have been produced with the apparatus in accordance with the invention have a particularly low residual content of the solvent of the spinning mass.

The term "apparatus for the manufacture of at least one hollow fiber membrane" is to be understood to mean, in the sense of the present application, that the apparatus defined in claim 1 can be used to produce one hollow fiber membrane or a plurality of hollow fiber membranes at the same time. In the sense of the present application, the term "manufacture of at least one hollow fiber membrane" designates the process of the forming of one or more spinning threads from a spinning mass, the precipitation of one or more spinning threads into one or more hollow fiber membrane(s), and, if applicable, the rinsing of the one or more hollow fiber membrane(s), in addition the drying of the one or more hollow fiber membrane(s), and, if applicable, the receiving of the one or more hollow fiber membrane(s) on a support. The term "manufacture" may also cover further intermediate steps not mentioned.

The term "spinning unit" in the sense of the present application is to be understood to refer to an assembly of components by means of which a spinning mass is extruded into a spinning thread.

The term "spinning mass" in the sense of the present application is to be understood to refer to a polymer solution in which at least one polymer is dissolved in a solvent. In particular, in the sense of the present application, a spinning mass may comprise a polymer solution of at least one hydrophobic polymer and at least one hydrophilic polymer. Further, the hydrophobic polymer may in particular be a polysulfone (PSU) and the hydrophilic polymer may in particular be a polyvinylpyrrolidone (PVP). The solvent may be a polar aprotic solvent, in particular N-methylpyrrolidone (NMP), N,N-dimethylacetamide, or dimethylsulfoxide (DMSO). Such materials are preferred in the manufacture of dialyzers, whereas for oxygenators, for example, very hydrophobic materials such as polypropylene (PP) or polymethylpentene (PMP) are used.

The term "spinning thread" in the sense of the present application is to be understood to refer to a thread which has been extruded from the spinning mass and which has not yet assumed the porous structure of the hollow fiber membrane to be produced. In particular, in the sense of the present application, the spinning mass extruded into a thread in the "precipitation gap" before being introduced into the precipitation bath is referred to as the spinning thread. The "precipitation gap" is understood to be the distance of the spinning thread from its extrusion to its entry into the precipitation bath. The speed at which the spinning thread passes through the precipitation gap is referred to as the "draw-off speed" in the sense of the present application. The "transport speed" is adapted to the draw-off speed or can be slightly higher than the draw-off speed in order to ensure that the hollow fiber membrane is guided through the apparatus in a taut manner. If the transport speed is increased, the draw-off speed is also increased in a corresponding manner.

The spinning unit comprises one or more annular gap nozzles. The term "annular gap nozzle" in the sense of the present application is to be understood to refer to an extrusion nozzle by means of which the spinning mass can be extruded into a hollow spinning thread. The annular gap nozzle has a central bore through which the coagulation medium can be extruded. Further, the annular gap nozzle has an annular gap concentrically with respect to the central bore, through which annular gap the spinning mass is extruded. Annular gap nozzles of this type are known from the state of the art. The term "annular gap nozzle" is also understood to cover such extrusion nozzles which comprise several annular gaps arranged concentrically with respect to the central bore.

The spinning unit further comprises feed channels in order to fluidically connect the source of the spinning mass with the annular gap or the concentrically arranged annular gaps of the annular gap nozzle and the source of the coagulation medium with the central bore of the annular gap nozzle. The spinning mass and the coagulation medium are co-extruded through the annular gap nozzle to form the hollow spinning thread, whereby the cavity of the spinning thread is filled with the coagulation medium.

The term "coagulation medium" in the sense of the present application is to be understood to refer to a liquid medium which, in contact with the inside of the hollow spinning thread, causes a phase inversion of the spinning mass in the spinning thread. For the method which is described in the present application, a coagulation medium is chosen which consists of a mixture of an aprotic polar solvent and a polar protic solvent. In particular embodiments in accordance with the present invention, the coagulation medium consists of N-methylpyrrolidone (NMP), N,N dimethylacetamide or dimethylsulfoxide (DMSO) and water. A coagulation of the spinning thread initiated by means of this coagulation medium is also referred to as a "non-solvent-induced phase separation" (NIPS). Further, in the sense of the present application, a coagulation of the spinning thread may also be initiated by means of a "temperature-induced phase separation" (TIPS) method. The phase inversion and coagulation of the spinning thread is initiated by a temperature reduction.

The term "precipitation bath" in the sense of the present application is to be understood to refer to a structural unit which comprises a reservoir of a precipitation medium into which the extruded spinning thread is introduced. In the precipitation bath the spinning thread is precipitated, whereby the coagulated structure of the spinning thread is further solidified to a porous hollow fiber membrane. In accordance with the present invention, a polar protic solvent, in particular water, is preferably used as the "precipitation medium". However, as an alternative or as part of a mixture, it can also contain alcohols or other protic liquids. The precipitation medium may also contain a polar aprotic solvent as a component. The pores and the cavity of the hollow fiber membrane are filled with liquid after the hollow fiber membrane has passed through the precipitation bath.

The term "rinsing unit" is to be understood to refer to a structural unit which comprises a reservoir of a rinsing liquid into which the hollow fiber membrane which has been obtained from the precipitation bath is introduced. The hollow fiber membrane is freed of the remaining solvent and polymer components which can still adhere to the hollow fiber membrane after the precipitation bath. It is preferred that water be used as the rinsing liquid pursuant to the present invention. However, the rinsing unit can also comprise a number of reservoirs which contain different rinsing liquids. After the hollow fiber membrane has passed through the rinsing unit, its pores and the cavity are filled with liquid, in particular with water.

The term "drying unit" is to be understood to refer to a structural unit which comprises a space into which the hollow fiber membrane is introduced and in which it can be dried. Preferably, the hollow fiber membrane which is obtained from the precipitation bath or, if applicable, from the rinsing bath and which is filled with liquid, in particular with water, is dried by means of the drying unit to a residual liquid content of less than 10 wt. % and more preferably to less than 3 wt. % based on the total weight of the fiber. The drying unit can comprise a space into which the hollow fiber membrane is introduced and in which a distance to be travelled by the hollow fiber membrane is specified via pulleys and guide means, so that the hollow fiber membrane remains in the (space of the) drying unit for a specified period of time in dependence on the transport speed.

The term "receiving unit" is to be understood to refer to a device comprising a support which is prepared to receive the hollow fiber membrane. In particular, this support may be a reel, a drum, a winder or a roll.

The term "pressure section" in the sense of the present application is to be understood to refer to a structural unit in the drying unit in which a positive pressure can be set relative to the ambient pressure of the installation apparatus according to claim 1. The term "positive pressure" is to be seen in relation to the normal atmospheric pressure of 1013.25 hPa and, in the context of the present application, refers to a pressure above the normal atmospheric pressure.

One skilled in the art will be aware of further details of an apparatus for the manufacture of a hollow fiber membrane. In particular, it will be known to one skilled in the art that an apparatus for the manufacture of hollow fiber membranes comprises means for guiding the spinning thread and the hollow fiber membrane in order to guide the spinning thread through the precipitation bath and to transport the hollow fiber membrane obtained therefrom through the precipitation bath, through the rinsing bath, through the drying unit and to the receiving unit. In this context, one skilled in the art will be familiar with corresponding guide rollers, guide rakes or guide plates.

Further, one skilled in the art will be familiar with the corresponding process parameters and spinning conditions which influence the extrusion of the spinning mass and the formation of the hollow fiber membrane. In particular, it will be known to one skilled in the art that the temperature of the annular gap nozzles, the relative atmospheric humidity in the precipitation gap, the height of the precipitation gap, the composition of the spinning mass and of the coagulation medium, as well as the temperature of the precipitation bath have an influence on the formation of the membrane structure of the hollow fiber membrane, e. g. its porosity and its separation properties. The process parameters for a TIPS method are known, for example, from WO17184817A1.

A further embodiment of the first aspect of the invention is characterized in that the pressure section of the drying unit comprises a pressure chamber which comprises an interior space, an inlet for introducing the at least one hollow fiber membrane into the interior space of the pressure chamber, an outlet for discharging the at least one hollow fiber membrane from the interior space of the pressure chamber and at least one gas inlet, wherein the at least one gas inlet is in fluid communication with at least one gas source and the pressure section is further constructed in such a way that a positive pressure can be generated in the interior space of the pressure chamber via the gas source.

According to this embodiment, a positive pressure can be applied which can act particularly effectively on the hollow fiber membranes guided through the pressure chamber. The pressure chamber can, for example, be constructed as a channel, which is e. g. tubular or slit-shaped, and into which the gas is introduced to set the positive pressure. In certain embodiments, it may be envisaged that the inner diameter of the pressure chamber is not constant, but in particular that it is enlarged in relation to the inlet and the outlet of the pressure chamber. It is envisaged that the at least one hollow fiber membrane or a group of hollow fiber membranes is or are guided through the pressure chamber and that at least a portion of the water transported in the hollow fiber membranes is removed by the set positive pressure. The positive pressure can be set by means of the inflow of a gas which flows through the gas inlet into the pressure chamber. The removal of water is particularly effective if liquid, in particular water, is discharged from the pressure chamber, in particular in the opposite direction to the direction of transport of the hollow fiber membrane, so that water which has been separated from the hollow fiber membranes can be discharged from the inlet of the pressure chamber.

The term "pressure chamber" in the sense of the present application refers to a delimited space in which a pressure can be set which is higher when compared with the ambient pressure. In the sense of the present application, the pressure chamber comprises an inlet opening and an outlet opening for the passage of the hollow fiber membranes.

The term "gas source" is to be understood to refer to an apparatus which can supply gas at a positive pressure relative to the ambient atmosphere. In particular, a gas source in the sense of the present application may be a pressurized gas container, e. g. a gas cylinder. However, the gas source can alternatively also be a compressor by means of which compressed air is provided. The gas introduced into the pressure chamber can escape through the inlet and the outlet of the pressure chamber according to the described embodiment.

The term "fluid connection" is to be understood to refer to a connection by means of which gas can be guided from the gas source to the gas inlet of the pressure chamber. Such fluid connections may be pipes or hoses.

A further embodiment of the first aspect of the invention is characterized in that the apparatus is constructed in such a way that the pressure in the pressure section of the drying apparatus is 1100 hPa to 10,000 hPa, or 1200 hPa to 5000 hPa, or 1200 hPa to 4000 hPa. It has been shown that, depending on the membrane porosity and the separation property, the pressure can be optimally adjusted within this range and thus good liquid removal is achieved.

A further embodiment of the first aspect of the invention is characterized in that the cross-sectional area of the inlet for introducing the at least one hollow fiber membrane into the interior space of the pressure chamber, and of the outlet for discharging the at least one hollow fiber membrane from the pressure chamber is less than 30 times, preferably less than 20 times, more preferably less than 10 times and further preferably less than 5 times the cross-sectional area of the one hollow fiber membrane or the total of the cross-sectional areas of the plurality of hollow fiber membranes. According to an embodiment, the cross-sectional area of the inlet is greater than 1.1 times, or greater than 2 times or greater than 3 times, the cross-sectional area of the one hollow fiber membrane or the total of the cross-sectional areas of the plurality of hollow fiber membranes.

The size of the cross-sectional area of the inlet and of the outlet of the pressure chamber can be used to adjust the pressure build-up, depending on the number of hollow fiber membranes which are passed through the pressure chamber. If the cross-sectional area of the inlet and of the outlet is too small, it becomes more difficult to guide the hollow fiber membranes through the pressure chamber. This may be the case if the cross-sectional area of the inlet or of the outlet is less than 1.1 times the cross-sectional area of the one hollow fiber membrane or the total of the cross-sectional areas of the plurality of hollow fiber membranes. If the cross-sectional area is too large, the setting of the positive pressure is made more difficult and the amount of gas which is required to achieve a desired gas pressure is increased.

The inlet and the outlet of the pressure chamber can be constructed in such a way that up to 128 fibers can be passed through the pressure chamber. If a larger number of hollow fiber membranes are passed through the pressure chamber, partial removal of the liquid, in particular of water, from the fibers at the interior of the group of hollow fiber membranes is made more difficult. Preferably, a group of 2 to 64 hollow fiber membranes are guided through the pressure chamber, in alternative embodiments a group of 5 to 32 hollow fiber membranes, in a further alternative embodiment a group of 10 to 20 hollow fiber membranes. If it is necessary to simultaneously remove liquid from an even larger number of hollow fiber membranes by means of a positive pressure of a gas atmosphere, several pressure chambers can be arranged simultaneously and in parallel in the apparatus for manufacturing the hollow fiber membranes.

A further embodiment of the first aspect of the invention is characterized in that the drying unit comprises a tempering section which has a heating device which is arranged so that a temperature of 50 to 230° C. can be set in the tempering section.

It has been shown that a drying unit which comprises a combination of a pressure section and a tempering section is particularly effective and efficient for the drying of the hollow fiber membrane. In particular, according to this embodiment, it is envisaged that a partial removal of the liquid, in particular of the water, from the hollow fiber membrane is effected by means of the pressure section. This allows the fiber to be dried more efficiently in the tempering section because hot air can penetrate into the pores and the cavity of the hollow fiber membrane.

The term "tempering section" refers to a section of the drying unit in which the temperature is set to between 50 and 230° C. The temperature range is to be selected such that the hollow fiber membrane is not damaged, but on the other hand such that sufficient drying of the hollow fiber membranes can also be achieved. In this regard, in particular temperature ranges of 70° C. or more, or 90° C. or more, or 110° C. or more, and 210° C. and less, or 190° C. and less, or 170° C. and less, in particular 70° C. to 210° C., or 90° C. to 190° C., or 110° C. to 170° C. are provided for the drying of the hollow fiber membranes in the drying section. Alternatively, drying at temperatures between 170° C. and 230° C. can also be provided, which results in particularly fast drying.

A further embodiment of the first aspect of the invention is characterized in that the tempering section of the drying unit comprises a tempering chamber which has an inlet for introducing the at least one hollow fiber membrane and an outlet for discharging the at least one hollow fiber membrane.

A further embodiment of the first aspect of the invention is characterized in that the pressure chamber and the tempering chamber are separate chambers, and that the apparatus is further constructed in such a way that the at least one hollow fiber membrane obtained from the precipitation bath or, if applicable, from the rinsing bath is first passed through the pressure chamber and then through the tempering chamber. A separation of the pressure chamber and the drying chamber has the advantage that liquid can already be removed in the upstream pressure chamber without the liquid having to be evaporated. The liquid can then be conveyed back into the rinsing bath, which reduces the liquid consumption in the rinsing bath, or collected separately and reused. After entry into the drying chamber, significantly less liquid needs to be evaporated, which accelerates the drying process and/or reduces the energy consumption by a reduction of the required enthalpy of vaporization.

A further embodiment of the first aspect of the invention is characterized in that the pressure chamber of the pressure section is divided into several compartments. Advantageously, different pressures can be set in the different compartments of the pressure chamber. According to this embodiment, a pressure gradient can be generated over the several compartments in the pressure chamber. The pressure gradient causes a particularly efficient discharge of liquid, in particular of water, from the pressure chamber and thus an efficient removal of liquid from the at least one hollow fiber membrane.

According to this embodiment, the gas inlet is arranged at at least one compartment of the pressure chamber. Water outlets for the discharge of the water separated from the hollow fiber membranes may be arranged at further compartments of the pressure chamber. A compartment may be formed within the pressure chamber by suitable geometrical designs of the interior of the pressure chamber and may be separated from another compartment. The compartments may be separated from each other by partition walls. In this context, the term "separating" means that different pressures establish themselves in the compartments and thus a first pressure in a first compartment is different from a second pressure in a second compartment of the pressure chamber. The compartments are open towards the central passage area of the hollow fiber membranes to the hollow fiber membranes.

A further embodiment of the first aspect of the invention is characterized in that the clear width of the interior space of the pressure chamber has, in the cross section parallel to the direction of travel of the hollow fiber membrane, at least one enlargement of the cross section and at least one reduction of the cross section, wherein the enlargement of the cross section and the reduction of the cross section preferably result in a conical shape of the inner side of the pressure chamber.

The conical inner side of the pressure chamber has the advantage that water which has been separated from the hollow fiber membranes can be removed particularly effectively. Due to the effective removal of the water it is possible to keep the total length of the pressure chamber in fiber direction at less than 50 cm, preferably at less than 20 cm, and further preferably at less than 12 cm, which enables a more compact construction of the apparatus for the manufacture of the hollow fiber membranes. According to a particular embodiment, the total length of the pressure chamber is at least 5 cm.

According to a preferred embodiment, several enlargements of the cross section and reductions of the cross section follow on one after the other inside the pressure chamber, so that several compartments with a conical section are formed in the interior space of the pressure chamber.

A further embodiment of the first aspect of the invention is characterized in that the at least one gas inlet of the pressure chamber is arranged at a position where the cross section of the clear width of the interior space of the pressure chamber has a maximum, preferably centrally between the inlet for introducing the at least one hollow fiber membrane into, and the outlet for discharging the at least one hollow fiber membrane out of, the pressure chamber. This embodiment facilitates the flow of the gas to the inlet and the outlet of the hollow thread or threads.

A further embodiment of the first aspect of the invention is characterized in that the pressure chamber has one or more outlets for discharging liquid, in particular water, wherein the outlets are preferably arranged at a position where the cross section of the clear width of the interior space of the pressure chamber has a maximum. The liquid, in particular water, separated from the at least one hollow fiber membrane can be discharged from the interior space of the pressure chamber via the outlets. This improves the efficiency of the drying process in the pressure chamber, as the liquid can be drained off particularly quickly and efficiently.

A further embodiment of the first aspect of the invention is characterized in that the pressure chamber has inlets and outlets for the hollow thread or threads, wherein a funnel-shaped opening joins onto the inlet. This protects the hollow fiber membrane or the group of hollow fiber membranes when they are introduced into the pressure chamber. It may also be provided that the outlet has a funnel-shaped opening. All edges, in particular all edges of the inlet, are preferably rounded.

In particular, in an embodiment of the first aspect of the invention, the apparatus for producing the at least one hollow fiber membrane is characterized in that it is constructed to produce a "high flux hollow fiber membrane, a "mid cut-off" hollow fiber membrane, a "high cut-off" hollow fiber membrane or hollow fiber membranes for blood plasma separation for extracorporeal blood treatment.

The term "high flux" as used herein refers to hollow fiber membranes with a molecular weight retention onset ("MWRO") between 5 kDa and 10 kDa and a molecular weight cut off ("MWRO") between 25 kDa and 65 kDa as can be determined by dextran sieving coefficient measurement according to Boschetti et al (2013). The average pore radius is in the region of 3.5 to 5.5 nm, wherein the pore size is determined by the MWCO on the basis of the dextran sieving coefficients according to Boschetti-de-Fierro et al. (2013) and Granath et al. (1967), as well as the analysis of the molecular weight distribution by gel chromatography at Sephadex. J Chromatogr A. 1967; 28 (C): 69-81. The main difference between high flux membranes and low flux membranes is a higher water permeability and the ability to remove small to medium molecules such as $\beta 2$ microglobulin.

The term "mid-cut-off" membranes is used for membranes whose separation properties lie between those of high flux and those of high cut-off membranes. "Low flux" membranes have separation properties which are characterized by a steeper sieving curve than that of high flux membranes.

The term "high cut-off" as used herein refers to hollow fiber membranes with a MWRO between 15 and 20 kDa and a MWCO between 170 and 320 kDa. The hollow fiber membranes are characterized by a pore radius on the surface of the selective layer between 8 and 12 nm. The determination of the MWRO and MWCO of the "high cut-off" hollow fiber membrane mentioned here is determined according to the methods of Boschetti-de-Fierro et al. (2013).

Hollow fiber membranes for blood plasma separation are characterized in that their MWCO is above the value defined for "high cut-off" hollow fiber membranes. In particular, the pore size of hollow fiber membranes for blood plasma separation is such that only cellular components of the blood are retained by the membrane.

"High flux" hollow fiber membranes, "mid cut-off" hollow fiber membranes, "high cut-off" hollow fiber membranes or hollow fiber membranes for blood plasma separation can be produced particularly well according to what is described according to the second aspect. The hollow fiber membranes mentioned have a high liquid permeability, in particular a high water permeability, so that the removal of liquid, in particular water, from the hollow fiber membrane in the pressure chamber can take place particularly effectively. This applies in particular to the "high cut-off" hollow fiber membranes with a MWRO of 10-20 kDa.

In accordance with the invention, two or more pressure chambers can also be connected in series. This is of particular advantage whenever only a comparatively small part of the liquid can be removed in the first pressure chamber. This may be necessary, for example, in the manufacture of "low flux" hollow fiber membranes, which require an increased drying effort due to their small pore diameter.

In a second aspect, the invention relates to a method of producing one or more hollow fiber membrane(s), comprising the steps of
  providing a source of a spinning mass,
  providing a source of a coagulation medium,
  co-extruding the spinning mass and the coagulation medium through at least one annular gap nozzle into at least one hollow spinning thread, the cavity of which is filled with the coagulation medium,
  introducing the at least one spinning thread into a precipitation bath containing a precipitating agent and precipitating the at least one spinning thread to at least one hollow fiber membrane, optionally subsequently introducing the at least one hollow fiber membrane into a rinsing bath containing a rinsing agent,
  introducing the at least one hollow fiber membrane which has been obtained from the precipitation bath, or, if applicable, introducing the at least one hollow fiber membrane which has been obtained from the rinsing bath, into a drying unit,
  if applicable, receiving, on a support, the at least one hollow fiber membrane obtained from the drying unit,
  characterized in that
  the at least one hollow fiber membrane passes through a pressure section in the drying unit, in which pressure section a positive pressure compared with atmospheric pressure is generated by introducing a gas into the pressure section and in which at least part of the precipitating agent or rinsing agent contained in the at least one hollow fiber membrane is separated from the at least one hollow fiber membrane.

One skilled in the art will be aware of the basic procedures and the details of a method for the manufacture of a hollow fiber membrane. In particular, it is known that, in a method for producing hollow fiber membranes, means for guiding the spinning thread and the hollow fiber membrane are used to guide the spinning thread through the precipitation bath and out of it and then to transport it to the rinsing bath, the drying unit and the receiving unit. In this context, one skilled in the art will be aware of corresponding guide rollers, guide rakes, guide plates or undulation tools which can be used to carry out the method in accordance with the invention.

One skilled in the art will also be aware of the process parameters and spinning conditions for extruding the spinning mass and for forming the hollow fiber membrane. In particular, one skilled in the art will be aware that the formation of the membrane structure of the hollow fiber membrane, e. g. its porosity, is influenced by the temperature of the annular gap nozzles, the relative atmospheric humidity in the precipitation gap, the height of the precipitation gap, the composition of the spinning mass and of the coagulation medium, as well as the temperature of the precipitation bath. In particular, the method according to the second aspect is suitable for producing hollow fiber membranes for nano, ultra and micro filtration. Coagulation of the spinning thread preferably takes place in accordance with the principle of "non-solvent induced phase separation" (NIPS). Alternatively, the coagulation of the spinning thread can also be controlled in accordance with a "temperature induced phase separation" (TIPS). TIPS methods with hydrophobic polymers are particularly suitable for the separation of gases, in particular in oxygenators. This applies in particular to the polymer PMP (polymethylpentene) and polypropylene (PP).

A further embodiment of the second aspect of the invention is characterized in that an undulation tool is arranged downstream of the drying unit and possibly upstream of the receiving unit. In the context of the present application, an "undulation tool" is to be understood to refer to a tool by means of which the hollow fiber membrane can be formed into an undulating geometric shape. Corresponding tools are known in the state of the art. Reference is made in particular to the details disclosed in DE 10 2017 204 524 A1.

The method according to the second aspect is suitable for the manufacture of a hollow fiber membrane. The method is equally suitable for producing a group of (several) hollow fiber membranes simultaneously. In this case, the spinning mass and the coagulation medium are extruded via a number of annular gap nozzles which are arranged in the spinning unit, to form a group of spinning threads, which are further processed into dried hollow fiber membranes as per the method in accordance with the invention. In particular, the apparatus for the manufacture of the hollow fiber membranes can be constructed in such a way that from 1 to 64 hollow fiber membranes, or 5 to 32 hollow fiber membranes, or 10 to 20 hollow fiber membranes, or up to 128 hollow fiber membranes can be produced simultaneously.

In the method of manufacture, as has already been described above, a hollow fiber membrane is filled with liquid, in particular with water, when it is being passed through the precipitation bath and, if present, the rinsing bath. The weight of the hollow fiber membrane can be reduced significantly by the pressure section of the drying unit in the method of manufacture. In particular, this makes it possible to increase the transport speed of the hollow fiber membrane in the apparatus for manufacturing the hollow fiber membrane without fiber breaks or other fiber damage such as flattening occurring. In particular, it is also possible to carry out thermal drying at a lower temperature or over a reduced distance with the same degree of drying, so that overall significant energy savings can be achieved in the manufacturing process and/or thermooxidative damage to the hollow fiber can be reduced or avoided. In addition, the hollow fibers produced in accordance with the invention have a particularly low content of the solvent of the spinning mass.

A further embodiment of the second aspect of the invention is characterized in that the positive pressure (compared with atmospheric pressure) in the pressure section is set to a pressure of from 1100 hPa to 10,000 hPa, or 1200 to 5000 hPa, or 1200 to 4000 hPa. The pressure ranges specified have been found to be advantageous in removing at least part of the water contained in the pores and in the cavity of the hollow fiber membranes during the method of manufacture.

A further embodiment of the second aspect of the invention is characterized in that the gas is selected from the group consisting of air, nitrogen, argon, carbon dioxide, water vapor or mixtures thereof. These gases have proved to be advantageous as they are inert in relation to the materials of the hollow fiber membrane. Preferred gases are nitrogen and synthetic air.

A further embodiment of the second aspect of the invention is characterized in that the pressure section is tempered to 30 to 125° C., preferably 30 to 110° C., more preferably 30 to 90° C. At elevated temperatures in the pressure section, an improved separation of water from the hollow fiber membrane has been observed. In particular, the hollow fiber membrane can be partially sterilized at temperatures above 100° C. In this case it is advantageous to set a water vapor atmosphere in the pressure section at a positive pressure and at 120° C.

A further embodiment of the second aspect of the invention is characterized in that part of the gas, which is applied to the pressure chamber, exits in the rinsing unit, in particular in the rinsing bath. Depending on the type of hollow fiber membrane and the geometry of the pressure chamber, this is regulated in accordance with the invention by adjusting the gas pressure until gas bubbles emerge in the rinsing bath to a sufficient degree. Then it is certain that a particularly effective liquid removal is guaranteed.

A further embodiment of the second aspect is characterized in that the transport speed of the hollow fiber membrane is 550 mm/s to 1000 mm/s, preferably more than 650 mm/s up to 900 mm/s, further preferably 750 mm/s to 800 mm/s.

According to a further embodiment of the second aspect, the hollow fiber membrane produced is a "high flux", a "mid-cut-off", a "high cut-off" hollow fiber membrane, or a hollow fiber membrane for blood plasma separation.

According to a further embodiment of the second aspect of the invention, the majority of the liquid is removed from the pores and the cavity, i. e. the lumen, of the membrane in the pressure chamber, particularly preferably more than 75% or more than 90%. This ensures efficient removal of liquid.

In a third aspect, the invention relates to a method for the manufacture of one or more hollow fiber membrane(s), comprising the steps of
  providing a source of a spinning mass,
  providing a source of a coagulation medium,
  co-extruding the spinning mass and the coagulation medium through at least one annular gap nozzle into at least one hollow spinning thread, the cavity of which is filled with the coagulation medium,
  introducing the at least one spinning thread into a precipitation bath containing a precipitating agent and precipitating the at least one spinning thread to form at least one hollow fiber membrane,
  if applicable, subsequently introducing the at least one hollow fiber membrane into a rinsing bath containing a rinsing agent,
  introducing the at least one hollow fiber membrane obtained from the precipitation bath, or, if applicable, introducing the at least one hollow fiber membrane obtained from the rinsing bath, into at least one drying unit,
  if applicable, receiving, on a support, the at least one hollow fiber membrane obtained from the drying unit, characterized in that the transport speed of the hollow fiber membrane is 550 mm/s to 1000 mm/s, preferably above 650 mm/s to 900 mm/s, more preferably 750 mm/s to 800 mm/s.

An embodiment of the third aspect is characterized in that the at least one drying unit comprises a pressure section in which a positive pressure compared with atmospheric pressure is set.

At these spinning speeds, a particularly economical manufacture of hollow fiber membranes is possible. The embodiments of the second aspect of the invention are also the subject of the third aspect of the invention.

DESCRIPTION OF THE INVENTION ON THE BASIS OF THE DRAWINGS

In the following, further embodiments of the invention are explained on the basis of the figures.

FIG. 1 shows a schematic representation of an embodiment of the apparatus 100 in accordance with the invention for the manufacture of at least one hollow fiber membrane. FIG. 1 shows a schematic simplified representation of the cross-section of an annular gap nozzle 101. The source of a spinning mass and the source of a coagulation medium are not shown in FIG. 1. Further, FIG. 1 shows schematically the spinning thread 102, which is guided through the precipitation gap 102b through the precipitation bath 103. Further, pulleys 105a to 105l are shown schematically, by means of which the spinning thread and the hollow fiber membrane are guided through the apparatus. The hollow fiber membrane 104 which is formed in the precipitation bath 103 is guided into a rinsing bath 106 by means of pulleys. In alternative embodiments, several rinsing baths can be arranged one after the other (not shown in FIG. 1). FIG. 1 also shows schematically a pressure chamber 200 with an inlet 201 and an outlet 202 for the one hollow fiber membrane 104 shown in FIG. 1. The hollow fiber membrane 104 passes through the pressure chamber and is guided through the tempering chamber 300 by means of an inlet 301, pulleys 105h to 105l and an outlet 302. A reel 400 is shown schematically, which receives the hollow fiber membrane 104 and combines it to bundle strands of hollow fiber membranes. For the sake of simplicity, the manufacture of only one hollow fiber membrane is shown in the schematic diagram of FIG. 1. However, the apparatus shown in FIG. 1 is equally suitable for the manufacture of a large number of hollow fiber membranes. The pressure chamber 200 and the tempering chamber 300 together form a drying unit 350. The tempering chamber can be operated in the schematic embodiment shown in FIG. 1 at a temperature range of 100 to 230° C. An undulation tool is not shown in FIG. 1. An undulation tool can additionally be arranged between the tempering chamber 300 and the reel 400. Also not shown in FIG. 1 is the gas inlet at the pressure chamber 200. This is shown in the subsequent figures. With the system 100 shown, hollow fiber membranes can be manufactured according to the NIPS and TIPS principles.

Figure 2:
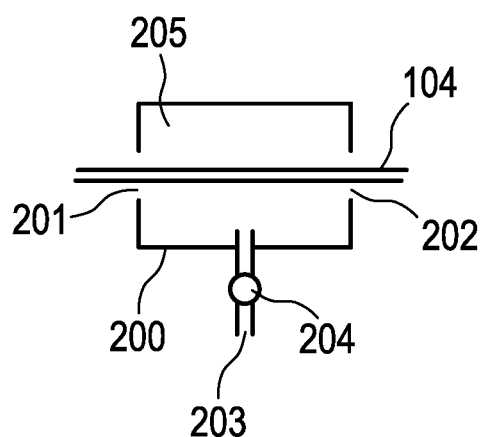

FIG. 2 shows a schematic representation of the cross-section of a pressure chamber 200 according to an embodiment. FIG. 2 shows a hollow fiber membrane 104 which is guided through the pressure chamber 200 via an inlet 201 and an outlet 202. Also shown is a gas inlet 203 and a valve 204, which may be present in order to regulate the flow of gas into the pressure chamber. The pressure chamber has an interior space 205 that forms a cavity as shown in the illustration. When gas is introduced through gas inlet 203, a positive pressure (compared with atmospheric pressure) builds up in the interior space 205.

Figure 3:
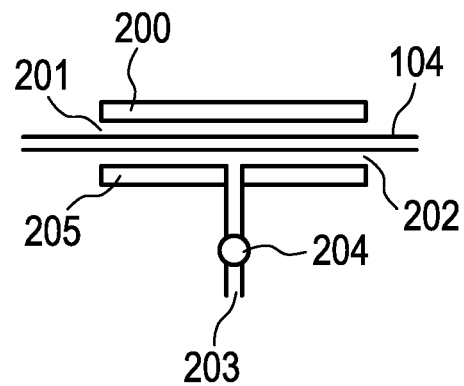

FIG. 3 shows a schematic representation of the cross-section of a pressure chamber 200 according to a further embodiment. In analogy to FIG. 2, FIG. 3 shows an inlet 201 for introducing the at least one hollow fiber membrane, an outlet 202 for discharging the at least one hollow fiber membrane 104, a gas inlet 203, a valve 204, as well as an interior space 205. The pressure chamber can have a tubular geometry or a slit-shaped geometry according to this embodiment.

Figure 4:
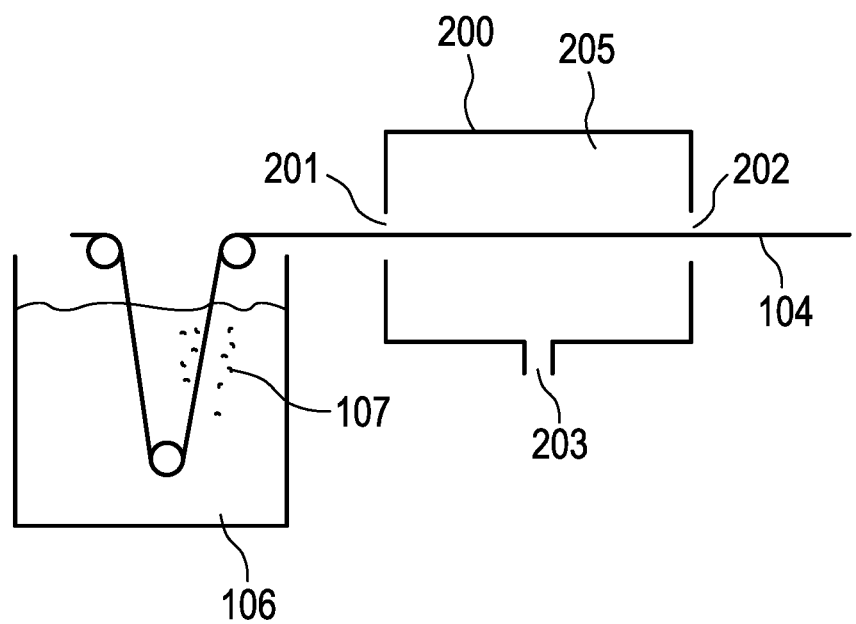

FIG. 4 shows a schematic representation of a portion of the apparatus 100 in accordance with the invention. The following are shown: the rinsing bath 106, the hollow fiber membrane 104, which is guided through the rinsing bath and through the pressure chamber 200, the inlet 201 and the outlet 202 of the pressure chamber, as well as the gas inlet 203 of the pressure chamber. Owing to the introduction of gas through the gas inlet 203 into the interior space, a positive pressure (compared with atmospheric pressure) is built up in the pressure chamber, as a result of which a portion of the water or liquid which is transported in the hollow fiber membrane 104 is separated from the hollow fiber membrane. In particular, the gas penetrates into the pores and into the cavity of the hollow fiber membrane and spreads within the cavity of the hollow fiber membrane in the same direction as the transport direction of the hollow fiber membrane and against the transport direction of the hollow fiber membrane. At a pressure of 3000 hPa in the pressure chamber, the gas in the hollow fiber membrane spreads against the transport direction to such an extent that the development of gas bubbles can be observed in the rinsing bath which may be located upstream, or in the precipitation bath located upstream.

Figure 5:
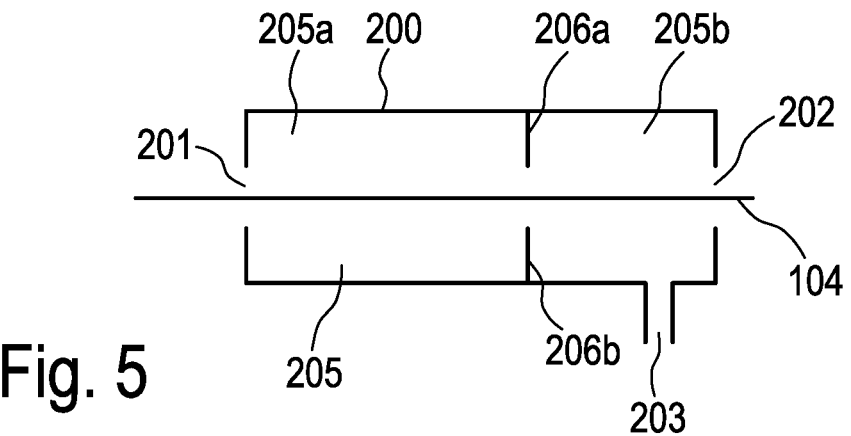

FIG. 5 shows a schematic representation of a further embodiment of a pressure chamber 200, whereby the interior space 205 is divided into two compartments 205a and 205b by two walls 206a and 206b and the hollow fiber membrane 104 is guided through the pressure chamber 200 via the inlet 201 and the outlet 202. The gas inlet 203 is located on the compartment 205b. The inflowing gas causes a first positive pressure (compared with atmospheric pressure) with a pressure P1 in the compartment 205b, whereby a second positive pressure (compared with atmospheric pressure) with a pressure P2 is established in the second compartment 205a. According to the embodiment shown in FIG. 5, P1 is greater than P2. The pressure P1 can be 3000 hPa. The pressure P2 can be 1500 hPa. By means of the compartments, a pressure gradient is set within the pressure chamber.

Figure 6:
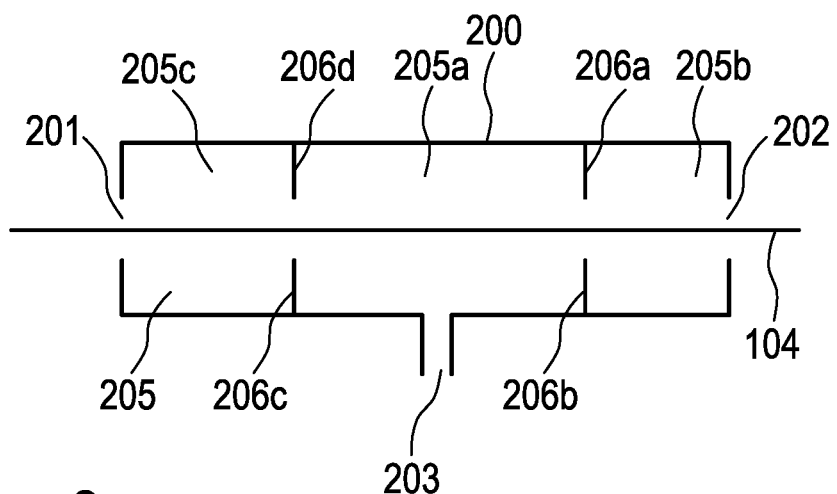

FIG. 6 shows a schematic representation of a further embodiment of a pressure chamber 200, wherein the interior space 205 is divided into the compartments 205a, 205b and 205c by four walls 206a, 206b, 206c and 206d and the hollow fiber membrane 104 is guided through the pressure chamber 200 via the inlet 201 and the outlet 202. The gas inlet 203 is located on the compartment 205a. The inflowing gas causes a first positive pressure (compared with atmospheric pressure) with a pressure P1 in the compartment 205a, whereby a second positive pressure (compared with atmospheric pressure) with a pressure P2 is established in the compartment 205b and a third positive pressure (compared with atmospheric pressure) with a pressure P3 is generated in the compartment 205c. According to the embodiment shown in FIG. 6, P1 is greater than P2. The pressure P1 can be 3000 hPa and is greater than the pressure P2. The pressure P2 is greater than the pressure P3, which can be 1500 hPa.

Figure 7:
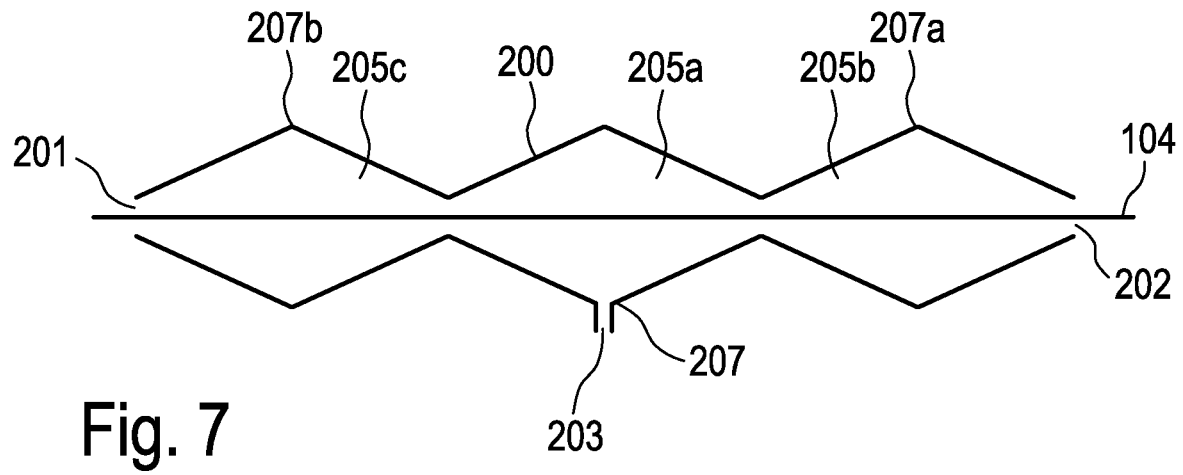

FIG. 7 shows a schematic representation of a further embodiment of a pressure chamber 200, wherein the interior space 205 has several enlargements of the cross section and several reductions of the cross section, wherein the enlargements of the cross section and the reductions of the cross section form several conical sections of the interior of the pressure chamber. Three compartments 205a, 205b and 205c are formed by the conical sections in the interior space of the pressure chamber 200, whereby the hollow fiber membrane 104 is passed through the pressure chamber 200 via the inlet 201 and the outlet 202. The conical sections of the inside of the pressure chamber are arranged symmetrically with respect to the gas inlet 203. The gas inlet 203 is located on the compartment 205a. The inflowing gas causes a first positive pressure (compared with atmospheric pressure) with a pressure P1 in the compartment 205a, whereby a second positive pressure (compared with atmospheric pressure) with the pressure P2 is established in the compartment 205b and a third positive pressure (compared with atmospheric pressure) with the pressure P3 is created in compartment 205c. According to the embodiment shown in FIG. 6, P1 is greater than P2. The pressure P1 can be 3000 hPa and is greater than the pressure P2. The pressure P2 is greater than the pressure P3, which can be 1500 hPa. According to FIG. 7, the at least one gas inlet 203 of the pressure chamber 200 is arranged at a position where the cross section of the clear width of the interior space of the pressure chamber has a maximum 207, wherein the gas inlet is located centrally between the inlet and the outlet of the pressure chamber. The maxima of the cross-section of the clear width of the interior space of the pressure chamber 207, 207a and 207b shown in FIG. 7 are of equal size.

A particularly efficient separation of water from the hollow fiber membrane is possible with the embodiments shown in FIGS. 5 to 7. It may be provided that the compartments shown in FIGS. 5 to 7 have an outlet opening for water. However, a discharge of water can also be possible via the inlets 201 and the outlets 202 of the pressure chamber.

Figure 8:
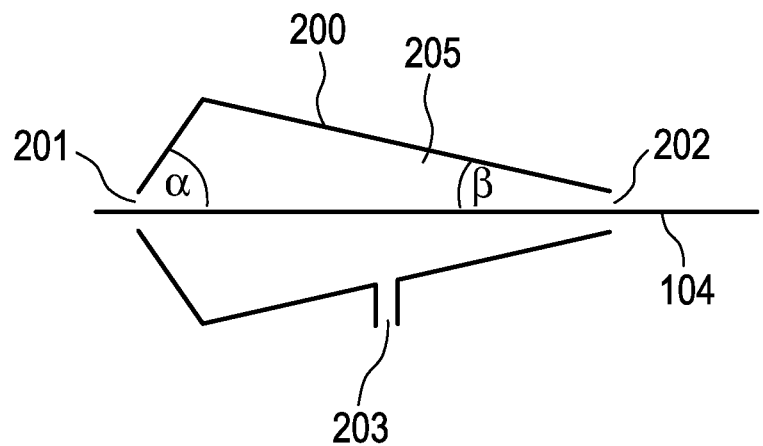

FIG. 8 shows a schematic representation of the cross-section of a pressure chamber 200 according to a further embodiment. FIG. 8 shows an inlet 201 for introducing the at least one hollow fiber membrane 104, an outlet 202 for discharging the at least one hollow fiber membrane 104, a gas inlet 203, as well as an interior space 205. According to this embodiment, the interior space 205 of the pressure chamber is subdivided into two asymmetrical conical sections.

Figure 9:
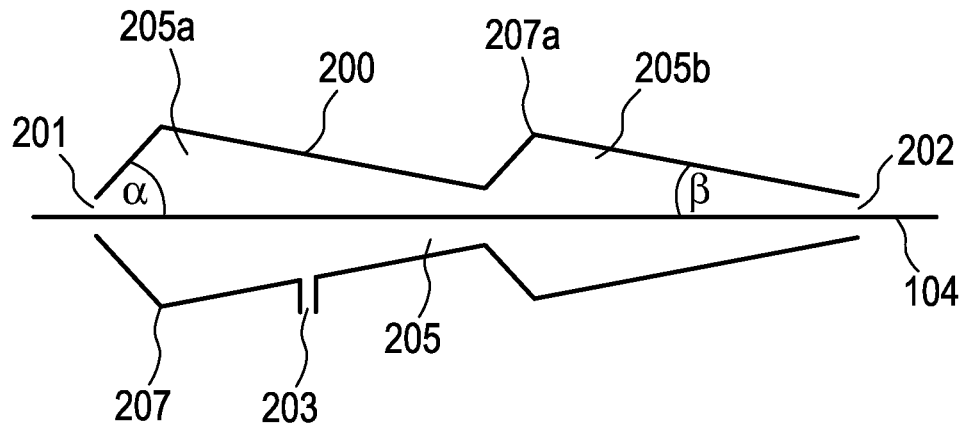

FIG. 9 shows a schematic representation of a further embodiment of a pressure chamber 200, wherein the interior space 205 forms conical sections by means of several enlargements of the cross section and reductions of the cross section, which subdivide the interior space into two compartments 205a and 205b, wherein the hollow fiber membrane 104 is guided through the pressure chamber 200 via the inlet 201 and the outlet 202. The conical sections are arranged asymmetrically within the interior space of the pressure chamber. The gas inlet 203 is located on the compartment 205a. The inflowing gas causes a first positive pressure (compared with atmospheric pressure) with a pressure P1 in the compartment 205a, whereby a second positive pressure (compared with atmospheric pressure) with the pressure P2 is established in the second compartment 205b. According to the embodiment shown in FIG. 5, P1 is greater than P2. The pressure P1 can be 3000 hPa. The pressure P2 can be 1500 hPa. By means of the compartments, a pressure gradient is set within the pressure chamber. The maximum 207a of the cross-section of the clear width of the interior space shown in FIG. 9 is greater than the maximum 207 of the cross-section of the clear width of the interior space.

FIGS. 8 and 9 show embodiments in which the conical shape joining onto the inlet 201 has an opening angle of α. Further, FIGS. 8 and 9 show embodiments in which the conical shape joining onto the outlet 202 has an opening angle of β. According to the embodiments of FIGS. 8 and 9, α is larger than 3.

Figure 10:
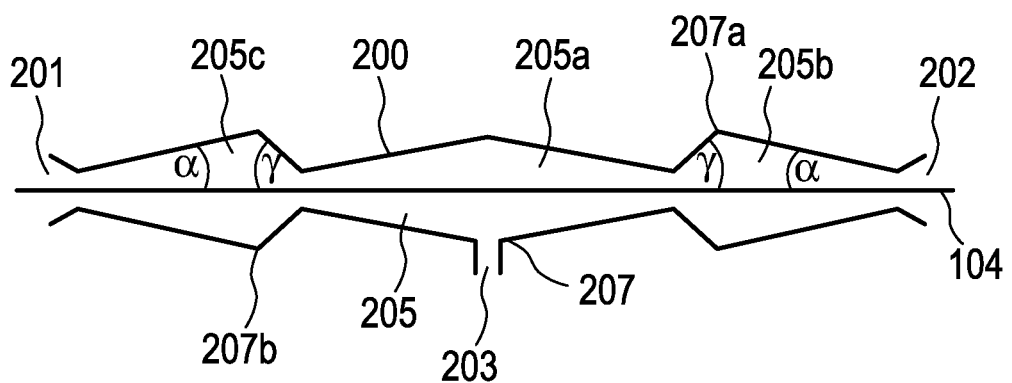

FIG. 10 shows a schematic representation of a further embodiment of a pressure chamber 200, wherein the interior space 205 has several enlargements of the cross section and several reductions of the cross section, wherein the enlargements of the cross section and the reductions of the cross section form several conical sections of the interior of the pressure chamber. Three compartments 205a, 205b and 205c are formed by the conical sections in the interior space of the pressure chamber 200, whereby the hollow fiber membrane 104 is passed through the pressure chamber 200 via the inlet 201 and the outlet 202. The conical sections of the inside of the pressure chamber are arranged symmetrically with respect to the gas inlet 203. The gas inlet 203 is located on the compartment 205a. The inflowing gas causes a first positive pressure (compared with atmospheric pressure) with a pressure P1 in the compartment 205a, whereby a second positive pressure (compared with atmospheric pressure) with the pressure P2 is established in the compartment 205b and a third positive pressure (compared with atmospheric pressure) with the pressure P3 is created in compartment 205c. According to the embodiment shown in FIG. 6, P1 is greater than P2. The pressure P1 can be 3000 hPa and is greater than the pressure P2. The pressure P2 is greater than the pressure P3, which can be 1500 hPa. According to FIG. 10, the at least one gas inlet 203 of the pressure chamber 200 is arranged at a position where the cross section of the clear width of the interior space of the pressure chamber has a maximum 207, wherein the gas inlet is located centrally between the inlet 201 and the outlet 202 of the pressure chamber. The maxima 207, 207a and 207b of the cross-section of the clear width of the interior space of the pressure chamber shown in FIG. 10 are of different size. In particular, the maximum 207 of the cross-section is smaller than the maxima 207b and 207a of the cross-section.

FIG. 10 shows an embodiment in which the conical shape joining onto the inlet 201 has an opening angle of α. Further, FIG. 10 shows an embodiment in which the conical shape joining onto the maximum 207b or 207a of the cross-section to the centrally arranged gas inlet 203 has an opening angle of γ. In this embodiment α is smaller than γ. This has the advantage that water which has been separated can be removed particularly well. This can make it possible to limit the total length of the pressure chamber 200 in the direction of the extent of the hollow fiber membrane 104 guided therethrough to less than 50 cm, preferably less than 20 cm, preferably less than 12 cm.

Figure 11:
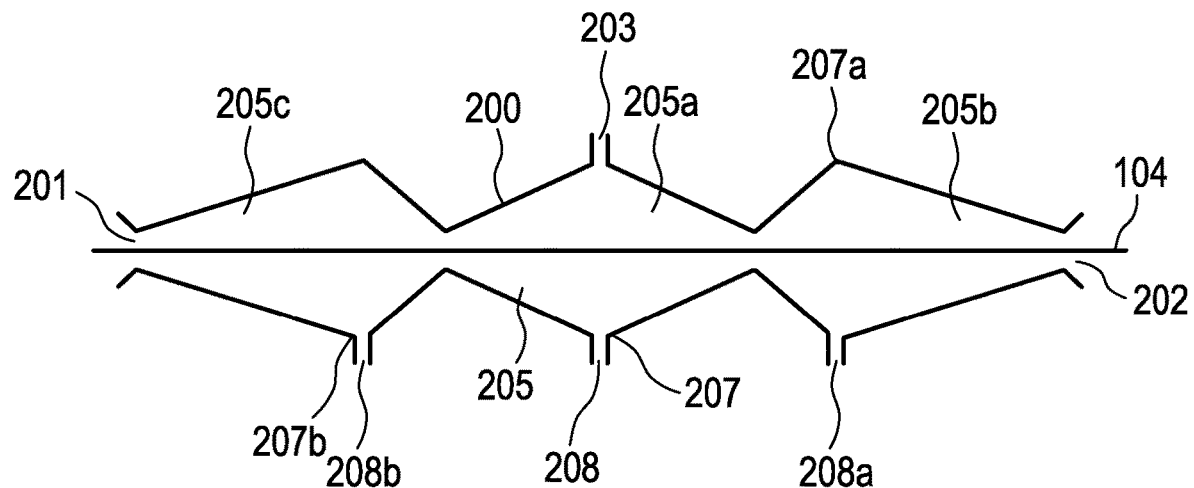

FIG. 11 shows a schematic representation of a further embodiment of a pressure chamber 200. The embodiment essentially corresponds to the embodiment shown in FIG. 10, whereby, in contrast to the embodiment shown in FIG. 10, the maxima 207, 207a and 207b of the cross-section are of equal size and respective outlets 208, 208a and 208b for liquid, in particular water, are arranged at each of the maxima 207, 207a and 207b of the cross-section, which water is separated from the hollow fiber membrane 104 in the pressure chamber 200, wherein the gas inlet 203 is additionally arranged at the maximum 207 of the cross-section.

Figure 12:
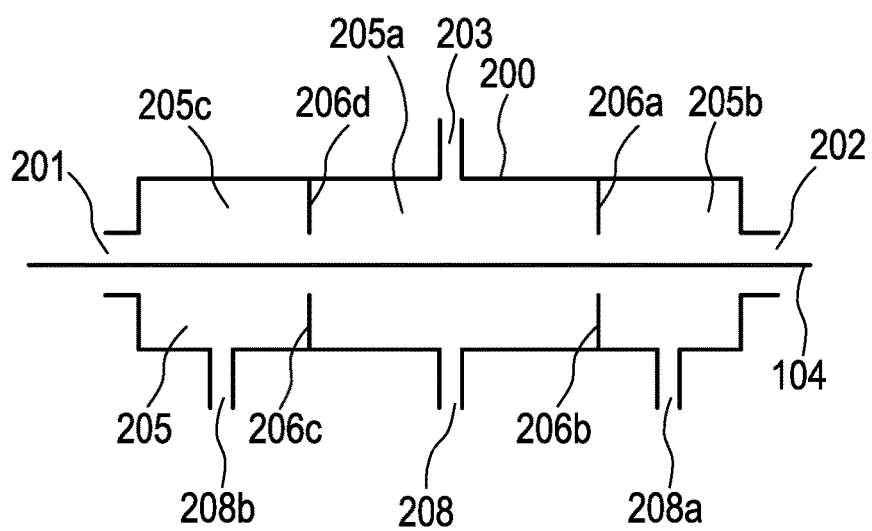

FIG. 12 shows a schematic representation of a further embodiment of a pressure chamber 200. The embodiment essentially corresponds to the embodiment shown in FIG. 6, whereby, in contrast to the embodiment in FIG. 6, outlets 208, 208a and 208b for water, which is separated from the hollow fiber membrane 104 in the pressure chamber 200, are respectively arranged on the compartments 205a, 205b and 205c.

Figure 13:
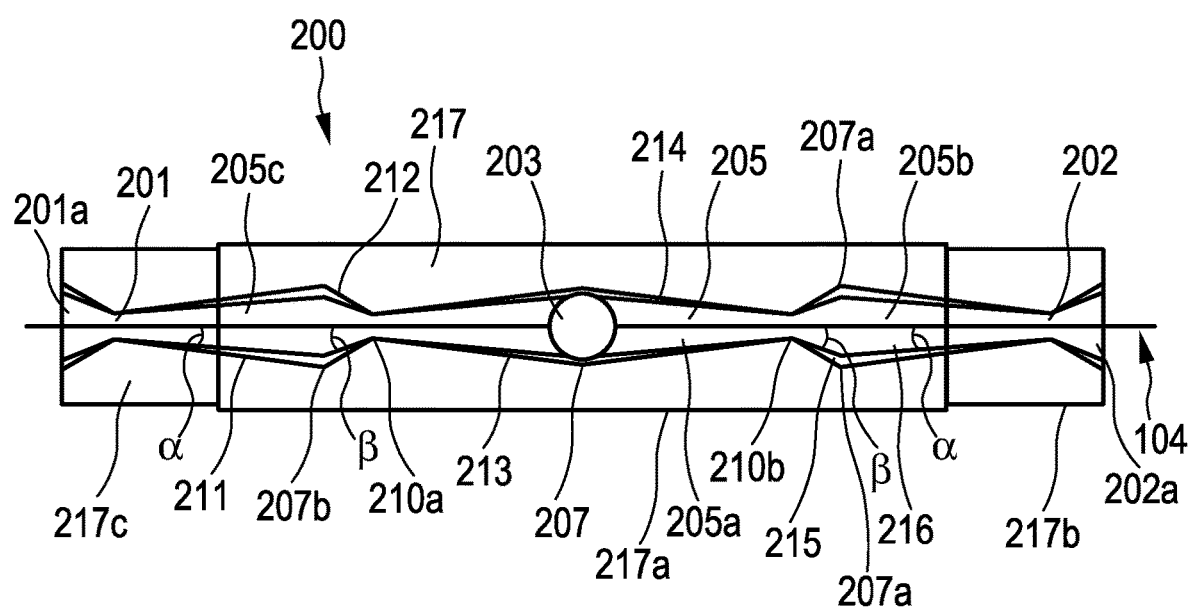

FIG. 13 shows a schematic representation of an embodiment of the pressure chamber 20, which corresponds to the embodiment shown in FIG. 10. FIG. 13 shows further details of the embodiment. FIG. 13 is a schematic representation in which parts of the pressure chamber shown are illustrated in a semitransparent manner. The pressure chamber is constructed in a tubular manner according to the embodiment shown. Further, the pressure chamber is constructed in a rotationally symmetrical manner with respect to the axis of its longitudinal extent, except for the gas inlet 200. The axis of its longitudinal extent corresponds to the straight line on which the hollow fiber membrane 104 is guided through the pressure chamber. In the schematic representation shown, the hollow fiber membrane referenced 104 is located on the axis of the longitudinal extent. In FIG. 13, the enveloping tubular wall 212 of the pressure chamber as well as structural parts of the gas inlet 203 are illustrated in a semitransparent manner. In a central area 217a of the pressure chamber, the wall 217 has a larger diameter than in an area at the end 217b, 217c. The interior space 205 of the pressure chamber 200 is subdivided into conical sections, whereby the conical sections 211, 212, 213, 214, 215 and 216 are joined onto one another. A first conical section 211 extends from the inlet 201 for hollow fiber membranes to a first maximum of the cross-section of the interior space 205 of the pressure chamber 200. Following on from there, a second conical section 212 extends from the first maximum 217b of the cross-section to a minimum 210a of the cross-section. Following on from there, a third conical section 213 extends from the first minimum 210a of the cross-section to a second maximum 207 of the cross-section. Following on from there, a fourth conical section 214 extends from the second maximum 207 of the cross-section to a second minimum 210b of the cross-section. Following on from there, a fifth conical section 215 extends from the second minimum 210b of the cross-section to a third maximum 207a of the cross-section. Following on from there, a sixth conical section 216 extends from the third maximum of the cross-section to the outlet 202 for the hollow fiber membrane 104. The gas flowing in through the gas inlet forms a positive pressure (compared with atmospheric pressure) in the interior space 205 of the pressure chamber which positive pressure extends from the inlet for the hollow fiber membrane 201 to the outlet 202 for the hollow fiber membrane. Funnel-shaped openings 201a and 202a join onto the inlet 201 and the outlet 202. This protects the hollow fiber membrane or the group of hollow fiber membranes when entering and leaving the pressure chamber. In particular, all edges in the interior space 205 of the pressure chamber are rounded in order to avoid damage to the hollow fiber membrane or membranes. The opening angles α and β of the conical sections are defined by the arrangement of the inner side of the conical sections with respect to the straight line of the longitudinal extent of the pressure chamber. In the first and sixth conical sections 211, 216, the opening angle is designated as α. In the second and fifth conical sections, the opening angle is designated as β. Preferably, α is smaller than β, as shown in FIG. 10. The adjoining conical sections 211, 212, 213, 214, 215, 216 of the interior space 205 of the pressure chamber 200 form three compartments 205a, 205b, and 205c, so that a pressure gradient as has been described in connection with the embodiment according to FIG. 10 is built up in a region from the gas inlet to the inlet for the hollow fiber membrane 201 and the outlet for the hollow fiber membrane 202 when gas flows into the interior space 205.

EXAMPLES

Comparative Example 1

16 hollow fiber membranes were produced simultaneously according to one of the embodiments disclosed in DE 10 2016 224 627. The following specification was used for the manufacture of a hollow fiber membrane:

A spinning solution consisting of 16 parts by weight of polysulfone (P3500 from Solvay), 4.4 parts by weight of polyvinylpyrrolidone (K82-86 from Ashland) and 79.6 parts by weight of DMAC was processed to a homogeneous spinning mass while stirring, heating to 60° C. and degassing. The spinning mass was co-extruded through an annular gap nozzle with a central bore, through which coagulation medium was passed, to form a spinning thread. The coagulation medium, consisting of 35% DMAC and 65% water, was guided inside the hollow spinning thread. The temperature of the annular gap nozzle was 70° C. The extruded spinning thread was passed through a precipitation gap whose atmosphere had a relative humidity of 100%. The height of the precipitation gap was 200 mm, a residence time in the precipitation gap of 0.4 s. was set. The draw-off speed of the spinning thread was therefore 650 mm/s. The residence time of the spinning thread in the precipitation gap is dependent on the draw-off speed and can be varied in alternative comparative examples. The spinning thread was introduced into the precipitation bath consisting of water which was tempered to 80° C. and the spinning thread was precipitated to a hollow fiber membrane. The hollow fiber membrane was then passed through rinsing baths, which were tempered to a temperature of 75° C. to 90° C. The hollow fiber membrane then passed through a tempering chamber of a drying unit at a temperature of 100° C. to 150° C. and was thus dried. The transport speed of the hollow fiber membrane was adapted to the draw-off speed.

The 16 hollow fiber membranes were then taken up by a reel and combined. The wound hollow fiber membranes were analyzed as regards any possible fiber defects. In the reeled hollow fiber membranes, several instances of flattened fibers or fiber breaks were detected.

Comparative Example 2

The conditions for manufacturing the hollow fiber membranes were selected according to comparison example 1. The draw-off speed of the spinning thread and of the hollow fiber membrane was reduced to 450 mm/s. The transport speed of the hollow fiber membrane was adapted to the draw-off speed. The hollow fiber membranes obtained were free of fiber flattening and fiber breaks.

Example 1

In contrast to comparison example 1, in example 1 the group of 16 hollow fiber membranes was guided through a pressure chamber in accordance with the embodiment according to FIG. 10, after passing through the rinsing baths and before being introduced into the tempering chamber. Air was introduced via the gas inlet of the pressure chamber so that a pressure of 3000 hPa was created in the central conical cavity of the pressure chamber, a pressure of 1500 hPa in the second conical cavity of the pressure chamber and a pressure of 1300 hPa in the third conical cavity of the pressure chamber. The dried hollow fiber membranes were wound up and examined as regards any possible defects. The manufacture of the hollow fiber membranes according to example 1 was carried out at different draw-off speeds. According to this, no fiber damage was found at a draw-off speed of 650 mm/s. The term draw-off speed is intended to refer to the speed at which the hollow fiber membrane passes through the apparatus for manufacturing the hollow fiber membrane.

According to example 1, the draw-off speed can therefore be increased, so that a higher manufacturing speed results when compared with the comparative examples and thus with the state of the art. This also resulted in energy savings per 1 km of the hollow fiber. Alternatively, the distance in the tempering section can thereby also be shortened, so that the apparatus for manufacturing the hollow fiber membranes can be operated with reduced construction costs.

The invention claimed is:

1. An apparatus for the manufacture of at least one hollow fiber membrane, comprising
   a spinning unit comprising at least one annular gap nozzle which is fluidically connected to a source of a spinning mass and a source of a coagulation medium in order to extrude at least one hollow spinning thread from the spinning mass, the cavity of which hollow spinning thread is filled with the coagulation medium,
   a precipitation bath for precipitating the at least one spinning thread to form at least one hollow fiber membrane,
   optionally, at least one rinsing unit for rinsing the at least one hollow fiber membrane,
   at least one drying unit for drying the at least one hollow fiber membrane,
   optionally, a receiving unit for receiving the at least one hollow fiber membrane on a support, wherein
   the at least one drying unit comprises a pressure section which is constructed in such a way that a positive pressure compared with atmospheric pressure can be set in the pressure section,
   the pressure section comprises a pressure chamber which comprises an interior space, an inlet for introducing the at least one hollow fiber membrane into the interior space of the pressure chamber, an outlet for discharging the at least one hollow fiber membrane from the interior space of the pressure chamber and at least one gas inlet, wherein the at least one gas inlet is in fluid communication with a gas source and the pressure section is further constructed in such a way that a positive pressure can be generated in the interior space of the pressure chamber via the gas source, the positive pressure removing liquid from the at least one hollow fiber membrane without the liquid being evaporated,
   the drying unit further comprises a tempering section which has a heating device which is arranged so that a temperature of 50 to 230° C. is capable of being set in the tempering section,
   the tempering section comprises a tempering chamber which has an inlet for introducing the at least one hollow fiber membrane and an outlet for discharging the at least one hollow fiber membrane, and
   the pressure chamber and the tempering chamber are separate chambers, and the apparatus is further constructed in such a way that the at least one hollow fiber membrane or several hollow fiber membranes obtained from the precipitation bath or, optionally, from the rinsing bath is/are first passed through the pressure chamber and then through the tempering chamber.

2. The apparatus according to claim 1, wherein the apparatus is constructed in such a way that the pressure in the pressure section of the drying apparatus is 1100 hPa to 10,000 hPa.

3. The apparatus according to claim 1, wherein a cross-sectional area of the inlet for introducing the at least one hollow fiber membrane into the interior space of the pressure chamber, and of the outlet for discharging the at least one hollow fiber membrane from the pressure chamber is less than 30 times, and at least 1.1 times or more the cross-sectional area of the hollow fiber membrane or the total of the cross-sectional areas of the several hollow fiber membranes.

4. The apparatus according to claim 1, wherein the pressure chamber of the pressure section is divided into several compartments.

5. The apparatus according to claim 1, wherein the clear width of the interior space of the pressure chamber has, in the cross section parallel to the direction of travel of the at least one hollow fiber membrane, at least one enlargement of the cross section and at least one reduction of the cross section, wherein the enlargement of the cross section and the reduction of the cross section result in a conical shape of the inner side of the pressure chamber.

6. The apparatus according to claim 5, wherein the at least one gas inlet of the pressure chamber is arranged at a position where the cross section of the clear width of the interior space of the pressure chamber has a maximum, centrally between the inlet for introducing the at least one hollow-fiber membrane into, and the outlet for discharging the at least one hollow-fiber membrane out of, the pressure chamber.

7. The apparatus according to claim 1, wherein the pressure chamber has one or more outlets for discharging the liquid, wherein the outlets are arranged at a position where the cross section of the clear width of the interior space of the pressure chamber has a maximum.

* * * * *